Dec. 30, 1930.  W. L. BEALL  1,786,886
FERTILIZER DISTRIBUTOR
Filed Aug. 24, 1928  2 Sheets-Sheet 1
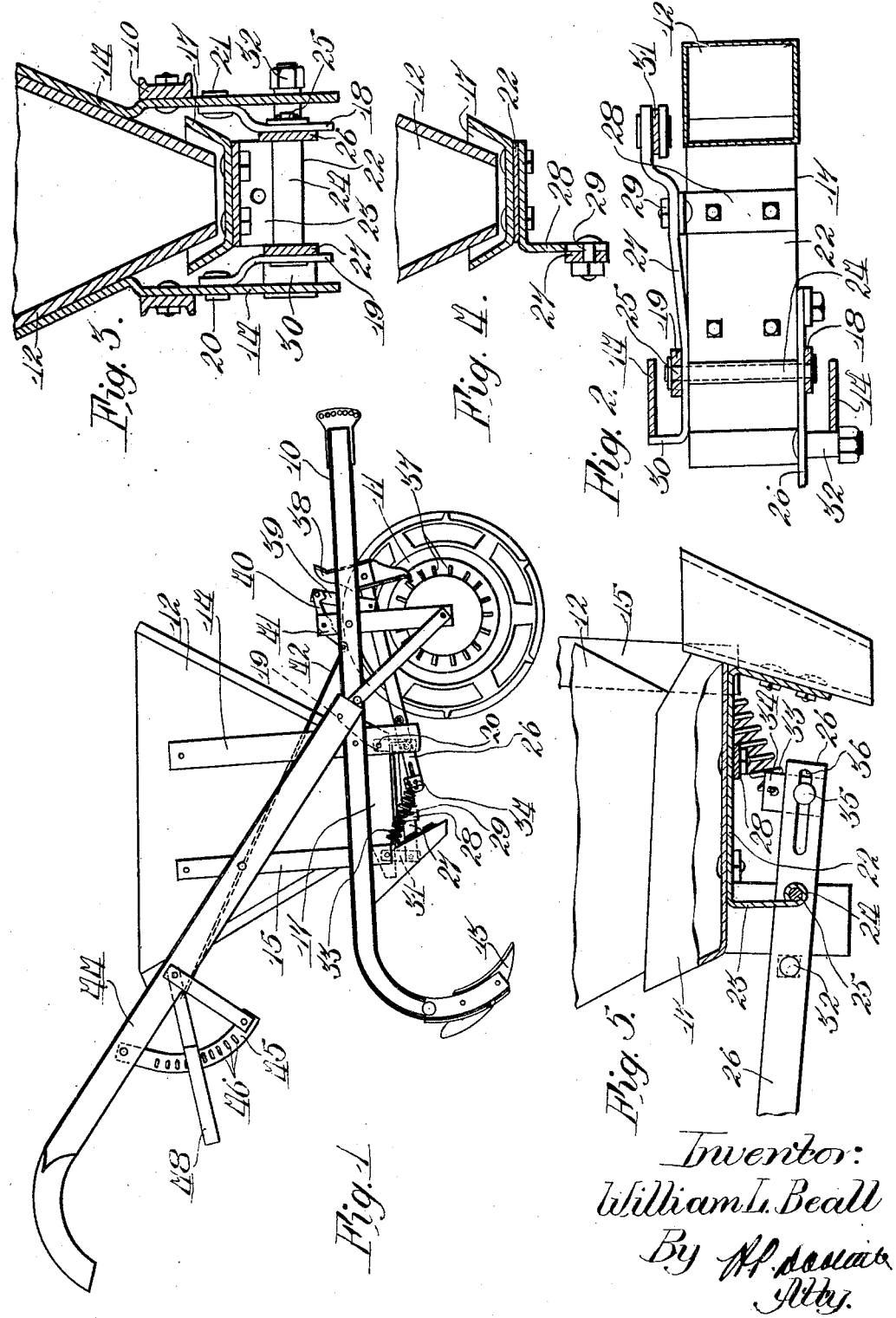
Inventor:
William L. Beall Dec. 30, 1930.  W. L. BEALL  1,786,886
FERTILIZER DISTRIBUTOR
Filed Aug. 24, 1928  2 Sheets-Sheet 2
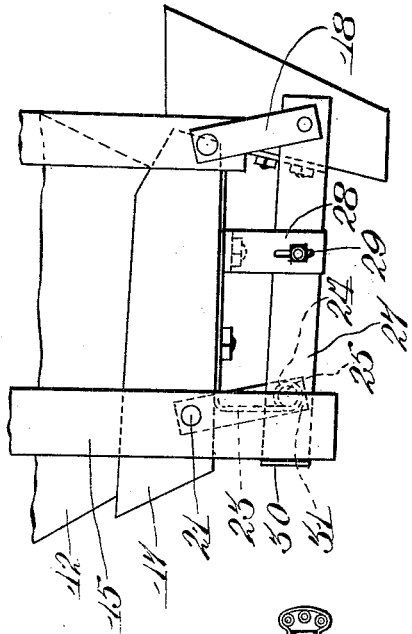
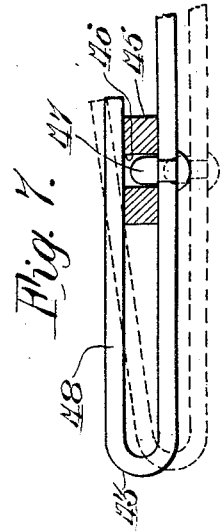
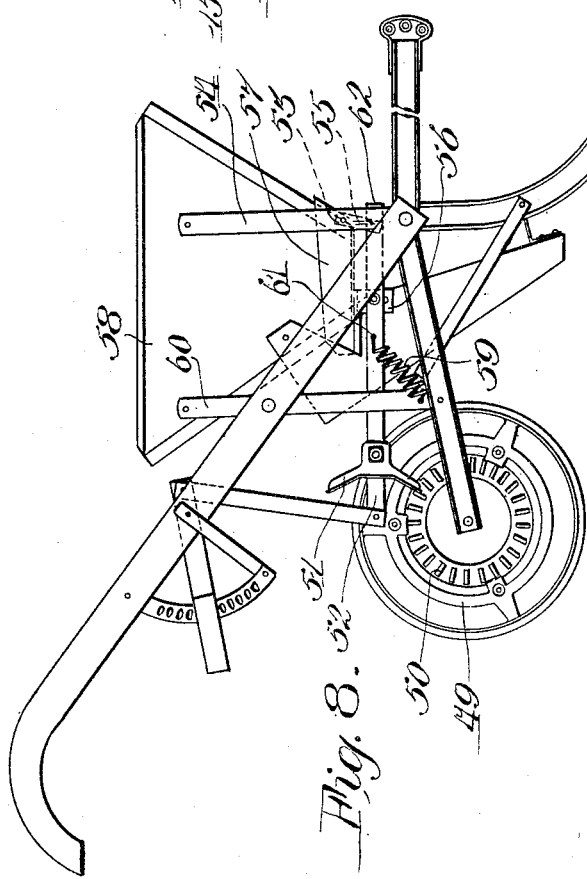
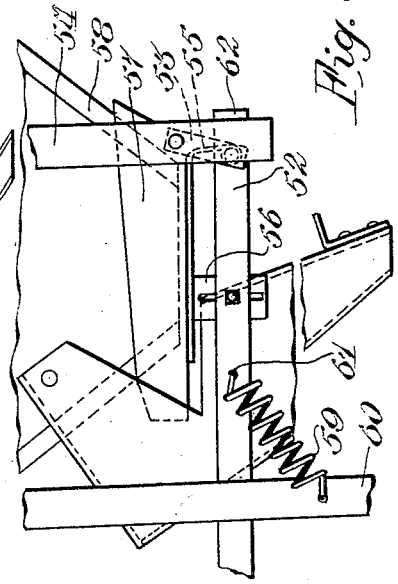
Inventor
William L. Beall
By H. P. Doolittle
Atty.

Patented Dec. 30, 1930

1,786,886

UNITED STATES PATENT OFFICE

WILLIAM L. BEALL, OF CHATTANOOGA, TENNESSEE, ASSIGNOR TO INTERNATIONAL HARVESTER COMPANY, A CORPORATION OF NEW JERSEY

FERTILIZER DISTRIBUTOR

Application filed August 24, 1928. Serial No. 301,789.

This invention relates to scattering unloaders, and more particularly to the type of scattering unloaders employing a hopper discharging mechanism having a vibrator delivery chute for governing the discharge of material.

An object of the invention is to provide a scattering unloader of improved and novel construction affording a durable and compact machine of certain advantages in its use.

Another object is to provide a scattering unloader having novel mechanism for operating and controlling the hopper discharging mechanism.

A further object of the invention is to provide a scattering unloader having a novel mechanism for producing reciprocating motion to the discharge chute.

Further objects of the invention will appear as the following description proceeds.

Illustrative embodiments of the invention are shown in the accompanying drawings in which,—

Figure 1 is a side elevation of an illustrative machine having a front wheel drive;

Figure 2 is a bottom plan view of the machine showing some of the structure in horizontal section;

Figure 3 is a vertical section through the hopper discharging mechanism taken on the line 3—3 of Figure 2;

Figure 4 is a vertical section through the hopper discharging mechanism taken on the line 4—4 of Figure 2;

Figure 5 is a side elevation of the hopper discharging mechanism having parts broken away to show in vertical section the discharge chute substantially on the line 5—5 of Figure 2;

Figure 6 is a side elevation of the hopper discharging mechanism shown in Figure 1;

Figure 7 is a detail view of the control mechanism for the discharge chute;

Figure 8 is a side elevation of a modification of the machine showing a rear wheel drive; and Figure 9 is a detail side elevation of the hopper discharging mechanism of the machine shown in Figure 8.

The machine shown in Figure 1 comprises a frame 10 supported by a driving wheel 11 which operates hopper discharging mechanism for causing a regulated flow of material from the hopper 12 carried by the frame. The frame is preferably A-shaped in the plan, the rearward end of its side members carrying covering shovels 13 which operate to cover deposited material with earth.

Figure 1 shows a front upright 14 and a rear upright 15. These uprights are rigid with the frame and they act as supports for the hopper 12, being preferably rigidly secured to the hopper. In the preferred embodiment there are two front uprights, the second front upright having its lower portion parallel to the lower portion of the upright 14. These portions preferably project downwardly from the frame as illustrated in Figure 1, the lower portion of the upright 14 acting as a fixed stop referred to below.

Figure 3 shows the discharge chute 17 supported by links 18 and 19 arranged inwardly of the uprights 14 and 15 and shown pivotally attached thereto at positions indicated at 20 and 21.

Figure 5 shows a plate 22 rigidly secured to the bottom of the discharge chute 17. One end of the plate 22 is formed as an upright support 23 extending downwardly from the discharge chute and having its lower end curved to form a sleeve 24. A pin 25 passes through the links 18 and 19, the sleeve 24, the pitman 26 and the bar 27 as illustrated in Figure 2.

The bar 27 is shown as constituting a support for the discharge chute 17. Near one end of the bar 27 a right angled support 28 is rigidly secured to the discharge chute and to the plate 22. This member 28 is shown in detail in Figure 4 of the drawings. To the downwardly extending part of the member 28 the bar 27 is rigidly and adjustably secured, as indicated at 29 in Figure 4.

As also indicated in Figure 2 of the drawings the forward end of the bar 27 is provided with a stop 30 herein shown as a right angularly bent part of the bar. This stop is adapted to engage against the upright 14, as shown, to limit the rearward movement of the discharge chute.

As above indicated, the bar 27 is supported at its forward end by the link 19. Its swinging support is completed by a parallel rear link 31 preferably of the same length as the link 19 between the axes of its pivots. By means of the bar 27 and the links 18, 19 and 31, the discharge chute is supported by two forward links and a rear link, the bar 27 acting as an intermediate member supporting the discharge chute, so that the latter moves in unison with the discharge chute.

On the opposite side of the machine from the stop 30 a second stop 32 is provided. This second stop is preferably fixed to the pitman 26, as shown, and is adapted to engage the upright 14 opposite the upright engaged by the stop 30. For preventing the sticking of fertilizer or other material to the hopper and discharge chute, the stops 30 and 32 are brought forcibly against the uprights 14 by a retractile spring 33. In the drawings one end of this spring is shown as anchored to the upright 15, its other end being secured to the pitman 26 through the intermediacy of an anchor block 34 preferably adjustably secured to the pitman by a pin and slot construction, as indicated at 35 and 36.

The discharge chute and the other parts of the movable structure above described are intermittently jerked forwardly by the contact of wheel lugs 37 with an impact block 38 rigidly secured to the front end of the pitman 26. As soon as a wheel lug 37 leaves the impact block, the pitman and the discharge chute structure are jerked rearward by the spring 33 so that the stops 30 and 32 are brought forcibly against the uprights 14.

As shown in the drawings the impact block 38 is a double block. Its opposing ends are similar in construction so that the block may be reversed in the event that it becomes broken, unduly worn, or otherwise damaged.

The forward end of the pitman 26 is pivotally supported by a link 39, which is shown as adjustably and pivotally supported by a lever 40 pivoted on the upper end of the wheel standard 41. The rearward end of the lever 40 is connected by a link 42 with the manual adjustment lever 43 shown as pivoted to a handle 44 and movable along a detent bracket 45 formed with openings 46 adapted to receive a lug 47 carried by the lever 43. The operation of this adjusting mechanism is indicated in Figure 7 of the drawings. In this figure the dotted line position of the member 47 indicates the position to which it is moved by lateral pressure upon the end of the lever 43, which is preferably U-shaped, to provide the resilient guide 48. To change vertically the position of the impact block 38 and thereby vary the throw of the pitman to regulate the discharge of the material from the hopper, the end of the lever 43 is pressed laterally until its parts come into positions such as those indicated by the dotted lines in Figure 7. The lever is then moved along the bracket 45 and the lateral pressure upon the lever released to allow the discharging mechanism to be held in the new position to which it is moved.

In Figures 8 and 9, another embodiment of the invention is shown. In this embodiment the supporting and driving wheel 49 is located at the rear of the machine. This wheel carries lugs 50 engaging a reversible impact block 51 which is carried by a pitman 52. This pitman is pivotally supported at its forward end by links 53 which are pivoted at their upper ends to uprights 54, the arrangement being here much the same as that indicated in Figure 3 of the drawings. Supported upon the pitman by the members 55 and 56 is a discharge chute 57 normally substantially closing the lower end of the hopper 58. The discharge chute is moved forwardly by contact of the lugs 50 with the impact member 51 and is quickly jerked rearwardly after each forward movement by a spring 59 anchored to uprights 60 at one end and secured to the pitman at its other end as indicated at 61. The forward end of the pitman is preferably bent at right angles so as to provide a stop 62 for engagement with the upright 54, which forms an abutment, to abruptly limit each rearward movement of the pitman and the discharge chute.

What is claimed as new is:

1. A vibrating delivery chute distributor comprising, in combination, a wheel supported frame and hopper, links pivotally supported by the frame, a structure connecting said links, a discharge chute supported by said structure beneath the discharge end of the hopper, a stop formed at one end of said structure, means for intermittently jerking the discharge chute and said structure in one direction, means for quickly returning the discharge chute and said structure after each of said actions, an abutment fixed relative to the hopper and the frame which the stop engages to abruptly limit each of said returning movements.

2. A vibrating delivery chute discharging mechanism comprising, in combination, a hopper having a discharge opening at its lower end, a discharge chute located below the lower end of the hopper and formed as a pan to normally prevent the flow of material from the hopper, downwardly extending supports rigid with relation to the hopper, a link pivoted to each support, a pitman for imparting reciprocating movement to the discharge chute, a bar extending lengthwise of the discharge chute and pivotally supported by one of said links and a third link, a plate supporting the discharge chute and formed with an upright but having at its lower end a sleeve located between said pitman and said bar, and a pin passing through said sleeve and forming a common pivotal mounting for the bar and pitman and the links.

3. A scattering unloader comprising, in combination, a frame, a hopper secured upon the frame, a driving wheel supporting the frame, a discharge chute swingably supported beneath the hopper, uprights rigid with the hopper and the frame, links movably supported by pivots fixed with relation to the hopper and the frame and pivotally supporting the discharge chute at their other ends, a pitman pivotally related at one end to the discharge chute and pivotally supported at its other end above driving lugs carried by the supporting wheel, an impact member rigidly secured to the pitman and having portions adapted to contact with the lug carried by the wheel, manually operable adjusting means for changing the position of the pivotal support of the end of the pitman near the wheel, a stop movable back and forth with the discharge chute, and a retractile spring for quickly jerking the discharge chute and the stop rearwardly after each actuation of the pitman by the supporting wheel.

4. A vibrating discharge chute distributor comprising, in combination, a frame, a supporting wheel, a hopper carried by the frame, a vibrating delivery chute beneath the discharge end of the hopper, opposite links pivotally supported by the frame and supporting the end of the delivery chute opposite its discharge end, a single link pivotally supported by the frame and supporting the other end of the delivery chute, fixed stops located at the end of said delivery chute near said first mentioned links, movable stops carried by the delivery chute and adapted to be brought into abrupt engagement with said fixed stops, a spring anchored relative to the frame and the hopper for bringing said movable stops abruptly against said fixed stops, a pitman pivotally carried by the distributor and pivoted to the discharge chute at one side thereof near one of said first mentioned links, means for adjustably and pivotally supporting the other end of the pitman adjacent said wheel so that it may be operated thereby, and a downwardly extending funnel-shaped chute secured at the delivery end of the discharge chute.

In testimony whereof I affix my signature.

WILLIAM L. BEALL.